(12) United States Patent
Souchier et al.

(10) Patent No.: US 11,544,302 B2
(45) Date of Patent: Jan. 3, 2023

(54) METHOD AND DEVICE FOR RECORDING A NEW OBJECT IN A CATALOGUE

(71) Applicant: BRIDGE AUDIO, Paris (FR)

(72) Inventors: Clément Souchier, Paris (FR); Sylvain Huet, Paris (FR)

(*) Notice: Subject to any disclaimer, the term of this patent is extended or adjusted under 35 U.S.C. 154(b) by 0 days.

(21) Appl. No.: 17/263,583

(22) PCT Filed: Jul. 29, 2019

(86) PCT No.: PCT/FR2019/051868
§ 371 (c)(1),
(2) Date: Jan. 27, 2021

(87) PCT Pub. No.: WO2020/025892
PCT Pub. Date: Feb. 6, 2020

(65) Prior Publication Data
US 2021/0232612 A1 Jul. 29, 2021

(30) Foreign Application Priority Data
Jul. 31, 2018 (FR) ..................................... 1857154

(51) Int. Cl.
*G06F 3/04842* (2022.01)
*G06F 16/332* (2019.01)
*G06F 16/335* (2019.01)

(52) U.S. Cl.
CPC ...... *G06F 16/3323* (2019.01); *G06F 3/04842* (2013.01); *G06F 16/335* (2019.01)

(58) Field of Classification Search
CPC ............... G06F 3/0482; G06F 3/04842; G06F 16/90335; G06F 16/9038; G06F 16/3323; G06F 16/335
See application file for complete search history.

(56) References Cited

U.S. PATENT DOCUMENTS

| 8,555,182 B2 | 10/2013 | Dietz et al. | |
| 2007/0288498 A1* | 12/2007 | Dietz | G06F 16/951 707/999.102 |

(Continued)

OTHER PUBLICATIONS

Michal Danihelka et al., Java Interface for Relaxed Object Storage, Sep. 1, 2013, IEEE Xplore, pp. 1459-1466 (Year: 2013).*

(Continued)

*Primary Examiner* — Tam T Tran
(74) *Attorney, Agent, or Firm* — Robert Facey

(57) ABSTRACT

A method for recording a new object in a catalogue of objects is disclosed. The method enables defining the value of an attribute and comprises: selecting an identifier of the new object; detecting, on a graphic element, the presence of a label representing the attribute; and determining the position of the label with respect to the graphic element, the value of the attribute computed based on said position. The detection includes a ranking of objects already recorded in the catalogue, comprising: determining, for each object already recorded in the catalogue, an index of similarity between a set comprising said attribute value and a set of values of corresponding attributes of said object; ranking the objects already recorded in the catalogue as a function of said indices of similarity; and displaying or updating a list of the objects already recorded in the catalogue as a function of said indices of similarity.

14 Claims, 11 Drawing Sheets

(56) References Cited

U.S. PATENT DOCUMENTS

| 2009/0187554 A1* | 7/2009 | Dugan | G06F 16/332 |
| | | | 707/999.005 |
| 2012/0173553 A1* | 7/2012 | Johansson | G06F 16/958 |
| | | | 707/754 |
| 2013/0167059 A1* | 6/2013 | Legris | G06F 3/0482 |
| | | | 715/769 |

OTHER PUBLICATIONS

G. Sreenivasulu et al., A Proficient approach for clustering of large categorical data cataloguing, Mar. 1, 2016, IEEE Xplore, pp. 2870-2875 (Year: 2016).*

* cited by examiner

| ID | AT1 | AT2 | AT3 | AT4 | AT5 | AT6 | AT7 | AT8 | AT9 | AT10 |
|---|---|---|---|---|---|---|---|---|---|---|
| DOC1 | 33 | 49 | 99 | 13 | 5 | 86 | 40 | 73 | 28 | 12 |
| DOC2 | 12 | 16 | 33 | 38 | 75 | 92 | 51 | 95 | 12 | 40 |
| DOC3 | 55 | 56 | 7 | 9.3 | 33 | 43 | 68 | 77 | 75 | 33 |
| DOC4 | 91 | 26 | 80 | 22 | 26 | 71 | 55 | 59 | 30 | 50 |
| DOC5 | 83 | 9 | 90 | 69 | 90 | 91 | 80 | 27 | 26 | 87 |
| DOC6 | 14 | 90 | 15 | 96 | 0 | 94 | 35 | 87 | 69 | 23 |
| DOC7 | 2 | 15 | 70 | 63 | 50 | 41 | 12 | 61 | 21 | 44 |

FIG.1

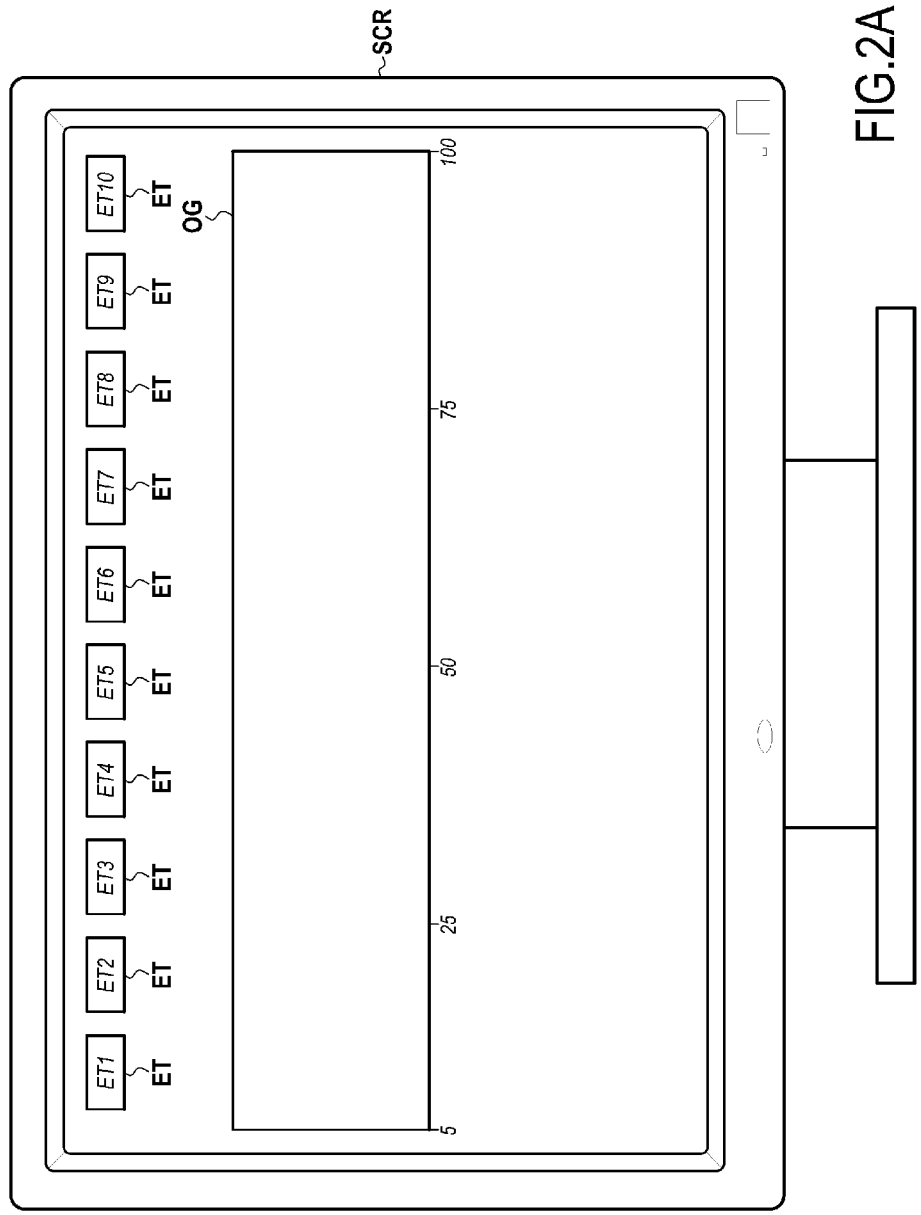

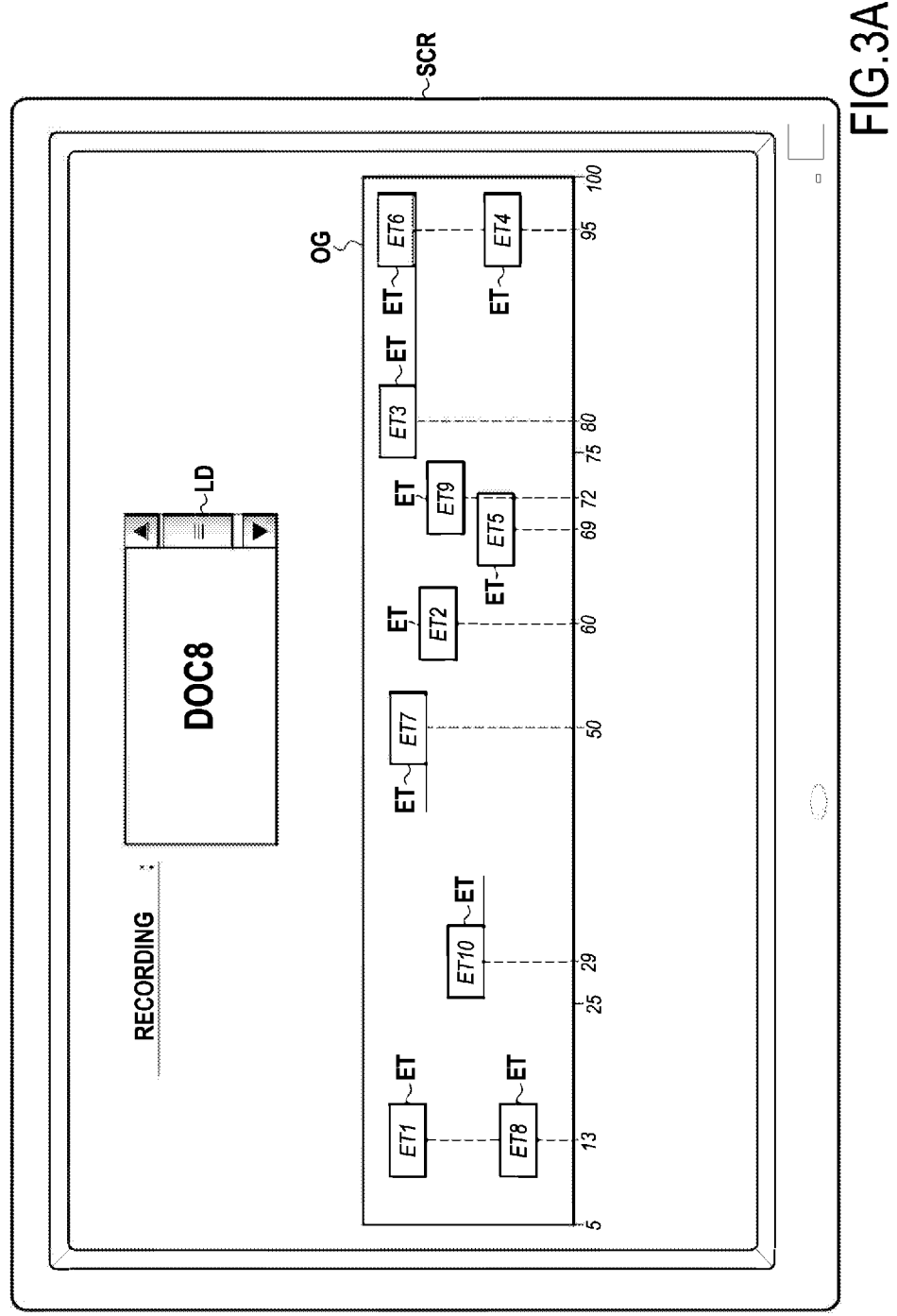

| ID | AT1 | AT2 | AT3 | AT4 | AT5 | AT6 | AT7 | AT8 | AT9 | AT10 |
|---|---|---|---|---|---|---|---|---|---|---|
| DOC8 | 13 | 60 | 80 | 95 | 69 | 95 | 50 | 13 | 72 | 29 |

|      | AT1 | AT2 | AT3 | AT4 | AT5 | AT6 | AT7 | AT8 | AT9 | AT10 |
|------|-----|-----|-----|-----|-----|-----|-----|-----|-----|------|
| AT1  | 1   | 0   |     |     |     |     |     |     |     |      |
| AT2  |     | 1   |     |     |     |     |     |     |     |      |
| AT3  |     | 0   | 1   |     |     |     |     |     |     |      |
| AT4  |     | 0   |     | 1   |     |     |     |     |     |      |
| AT5  |     | 0   |     |     | 1   |     |     |     |     |      |
| AT6  |     | 0   |     |     |     | 1   |     |     |     |      |
| AT7  |     | 0,8 |     |     |     |     | 1   |     |     |      |
| AT8  |     | 0   |     |     |     |     |     | 1   |     |      |
| AT9  |     | 0   |     |     |     |     |     |     | 1   |      |
| AT10 |     | 1,3 |     |     |     |     |     |     |     | 1    |

MAT (ID,2)      MAT

FIG.6

METHOD AND DEVICE FOR RECORDING A NEW OBJECT IN A CATALOGUE

BACKGROUND

The invention lies in the field of software applications including a graphic interface allowing the administrator of a digital catalogue of objects to easily and quickly specify the attributes of the objects of the catalogue, these objects being able to be subsequently searched for in the catalogue by a user according to their attributes. These objects can be of any type. They can for example be manufactured products, real estate properties, multimedia objects, food products, for example wine, or services.

Many websites allow a user to search a digital catalogue for objects having a certain number of attributes specified by the user. In particular real estate property search sites are known in which the user can enter the property attributes that he wishes to select, for example the presence or otherwise of a swimming-pool or a garage, its surface area, a price range etc. These attributes can be binary (for example presence or otherwise of a swimming-pool) or non-binary (for example a price range, a surface area etc.).

In the current state of the art, these applications generally propose to select and input the different attributes via drop-down menus, input areas, checkboxes etc. This has drawbacks.

Firstly, if the attributes that the object must have are numerous, the selecting and inputting of these different attributes by the user are burdensome as they require numerous operations, in particular numerous mouse clicks (opening of drop-down menus, selecting of an option from a multiple-choice list etc.)

When the attributes are numerous, it is generally necessary to make the application window scroll to input them and it is then impossible to view them simultaneously.

Moreover, the graphic elements allowing the user to input a non-binary attribute, for example a price range, in the form of an input window or a scale for example, take up considerable space on the graphic interface of the application. It is often chosen to show such a graphic element (gauge scale or input area) only for the time taken to input the attribute itself and to hide it when the attribute has been inputted to show only the value of the selected attribute, for example the price range. This mechanism complexifies the user interface and lengthens the time needed to select the different attributes.

Moreover, known applications generally offer a selection mechanism of exclusive, "funnel" type, so that only objects having all the inputted attributes are shown to the user. Consequently, when the search returns few or no results, it is difficult for the user to quickly identify the more distinguishing attributes.

A known solution for solving this problem consists in increasing the number of attributes, but it is satisfactory neither for the end user who is making the searches, nor for the administrator of the object catalogue who has to specify a value for each of the attributes and do so for all the objects of the catalogue.

Search engines are also known in which a user inputs a request, for example in natural language or using keywords. For example a user who wishes to select properties with swimming-pool, garage, of a surface area between 150 $m^2$ and 200 $m^2$ and a price between 700 000 Euros and 800 000 Euros can input into a search engine a request of "house with swimming-pool and garage and surface area between 150 $m^2$ and 200 $m^2$ and a price between 700 000 Euros and 800 000 Euros".

In most search engines, the selection criteria all have the same weight, so that only property items meeting all the criteria are shown to the user. Specifically, conventional search engines do not easily allow a user to rank search criteria by order of priority to respond to a request of the type "house with swimming-pool, of a surface area between 150 $m^2$ and 200 $m^2$, preferably with a price between 700 000 Euros and 800 000 Euros and preferably with garage". It will be understood that the advantage of such a request would be to show to the user the houses with swimming-pool and the desired surface area, but showing him as a priority those houses that include a garage and have a price between 700 000 and 800 000 Euros.

Document US2009/0187554 A1 presents a graphic interface allowing the user to give a priority to the criteria of a search engine. In this document, the user is prompted to position graphic elements representing the search criteria on a target, the criteria placed at the center of the target having a higher priority than those placed at the edge. In the previous example, the user would place at the center of the target the criteria "swimming-pool" and "price" and at the edge the criteria "surface area" and "garage".

Document US2007/288498 A1 presents a graphic interface in the shape of a magnet for the same use, i.e. to rank search criteria according to their priority.

Although such interfaces do indeed make it possible to give a priority to certain search criteria, they do not allow the user to formulate a request specifying different values or intensities, including for search criteria of the same weight. For example the request "very sunny house in a lively neighborhood near the shops", the criteria "sunlight", "liveliness", "distance from shops" all have the same weight but with different ranges of value or intensity, respectively "very high", "high", and "low" to express "very sunny", "lively neighborhood" and "short distance from shops".

Moreover, the search interfaces known to date are of no use to the administrator of the catalogue when he enters the attributes of the objects of the catalogue.

It is therefore usual to develop two human-machine interfaces, a first interface intended for the administrator of the catalogue to allow him to easily specify the attributes of the catalogue objects and a second interface allowing users to search for objects in the catalogue meeting certain criteria.

The invention proposes a new approach to allow:
a user to quickly and easily search for an object in a catalogue of objects,
the administrator of the object catalogue to easily and quickly specify the attributes of the objects of the catalogue.

BRIEF SUMMARY

According to a first aspect the invention relates to a method for recording a new object in a digital catalogue of objects. The method is implemented by a computer and makes it possible to define the value of at least one attribute of the new object. It includes:
a step of selecting an identifier of the new object;
a step of detecting, on one and the same graphic element, the presence of a label representing this attribute;
a step of determining the relative position of the label with respect to the graphic element;
the value of the attribute being computed on the basis of this position.

This recording method implements, each time it detects a new label on the graphic object or a movement of a label on the graphic object, a ranking or reranking of the objects already recorded in the catalogue, this ranking including:

a step of determining, for each of the objects already recorded in the catalogue, an index of similarity between a set comprising at least the attribute value associated with the label positioned or moved last on the graphic object and the set of the values of the corresponding attributes of this object;

a step of ranking the objects already recorded in the catalogue as a function of the indices of similarity; and a step of displaying or updating a list of the objects already recorded in the catalogue, this list being ordered as a function of the indices of similarity.

Correspondingly, the invention relates to a device for recording a new object in a digital catalogue of objects. This device makes it possible to define the value of at least one attribute of the new object and includes:

selecting means allowing the selection of an identifier of said new object;

detecting means configured to detect, on one and the same graphic element, the presence of a label representing this attribute;

determining means configured to determine the relative position of the label with respect to the graphic element;

the value of this attribute being computed on the basis of this position.

This device includes:

determining means configured to determine, with each detection of a new label on the graphic object or of a movement of a label on the graphic object, and for each of the objects already recorded in the catalogue, an index of similarity between a set comprising at least said attribute value associated with the label positioned or moved last on the graphic object and the set of values of the corresponding attributes of this object;

ranking means configured to rank the objects already recorded in the catalogue as a function of said indices of similarity; and means for displaying or updating a list of objects already recorded in the catalogue, the list being ordered as a function of the indices of similarity.

According to a second aspect, the invention relates to the ranking method implemented in the recording method as such. This method makes it possible to rank the objects of a digital catalogue of objects, each object being associated with at least one attribute graphically represented by a label.

This method includes:

a step of detecting the presence of at least one label on one and the same graphic element;

a step of determining the relative position of this label with respect to the graphic element;

a step of computing the values of the attributes associated with these labels as a function of their positions;

a step of determining, for each of the objects of the catalogue, an index of similarity between a set comprising these attribute values and the set of the values of the corresponding attributes of this object;

a step of ranking objects of the catalogue as a function of these indices of similarity; and a step of displaying or updating a list of objects of the catalogue ordered as a function of these indices of similarity.

Correspondingly, the invention relates to a ranking device, for example a computer, configured to rank objects from a catalogue of objects, each object being associated with at least one attribute graphically represented by a label.

This device includes:

detecting means configured to detect the presence of at least one label on one and the same graphic element;

determining means configured to determine the relative position of this label with respect to the graphic element;

computing means configured to compute values of the attributes associated with these labels as a function of their positions;

determining means configured to determine, for each of the objects of the catalogue, an index of similarity between a set comprising these attribute values and the set of the values of the corresponding attributes of this object;

ranking means configured to rank objects of the catalogue as a function of these indices of similarity; and displaying means configured to display or update a list of objects of the catalogue ordered as a function of these indices of similarity.

It is of fundamental importance to note that the labels are not used to give a priority to certain attributes, but to define values for the attributes.

The invention allows the administrator of the catalogue to very quickly give values or intensities to the attributes of the objects he wishes to record in the catalogue. The term "record" is here understood to mean the first recording of an object in the catalogue or an updating of an object in the catalogue by modification of an attribute.

Very advantageously, as soon as the administrator of the catalogue records or updates an object in the catalogue by positioning a label associated with an attribute of this object, he can check that the values of the attributes of this new object are consistent with those of the objects already recorded in the catalogue.

The invention proposes two preferred modes of implementation.

In a first mode, the objects already recorded in the catalogue are ranked, taking into account only the attribute associated with the label positioned or moved last on the graphic object so as to see if the value of this attribute considered alone is consistent with the values of this attribute already assigned to the other objects of the catalogue.

In a second mode the attributes of all the labels of the new object are taken into account and the ranking makes it possible to determine the objects of the catalogue that overall come nearest to this object.

The administrator or the user can thus easily move an attribute label to make its value or intensity vary in such a way as to maintain consistency in the relative description of the catalogue objects with respect to one another.

In a particular embodiment, the graphic interface proposes a button to allow switching from the first mode to the second mode described above and vice versa.

The fact of dynamically effecting these rankings when recording a new object is very advantageous when several administrators or users are recording objects in the catalogue.

According to a third aspect, the invention relates to a definition method, implemented by a computer, for defining the value of at least one attribute of an object contained in a catalogue of objects.

This method includes:

a step of selecting an identifier of this object;

a step of detecting, on one and the same graphic element, the presence of at least one label representing this attribute;

a step of determining the relative position of this label with respect to the graphic element;

the value of the attribute being computed on the basis of this position.

Correspondingly, the invention relates to a definition device, for example a computer, for defining the value of at least one attribute of an object included in a catalogue of objects.

This device includes:

selecting means, configured to allow the selection of an identifier of this object;

detecting means configured to detect, on one and the same graphic element, the presence of at least one label representing this attribute;

determining means configured to determine the relative position of this label with respect to the graphic element; the value of the attribute being computed on the basis of this position.

The definition method is typically implemented by the administrator of the catalogue to define the values of the attributes of the catalogue objects.

The ranking method is typically implemented by a user to search for the catalogue objects corresponding to the attributes that he has selected.

Thus and in a general way, the invention proposes, according to its second aspect, a mechanism allowing a user to place, on one and the same graphic element, labels corresponding to the attributes of the searched-for object, the position of the label on the graphic element defining the value of this attribute.

And according to its third aspect, the invention proposes a mechanism allowing the administrator of the catalogue to place, on one and the same graphic element, labels corresponding to the attributes of the object to be defined, the position of the label on the graphic element defining the value of this attribute.

In other words, the selection of the attribute and the choice of its value are done by the single operation of moving the corresponding label on the graphic element. The invention thus makes it possible to define a large number of attributes very quickly.

The graphic interface of the application is very compact since it is essentially limited to a single graphic element and to the labels, the latter occupying substantially the place of the attribute label (i.e. name.) Even for a large number of attributes, the set of attributes selected can be viewed simultaneously.

Very advantageously, the method according to the invention only ranks the objects according to their relevance (represented by the indices of similarity) so that results are always shown to the administrator of the catalogue or to the user. Even if no object of the catalogue meets all the selected attributes, the nearest objects are shown to him.

In an embodiment of the recording method or the ranking method according to the invention, the set of values used to determine the indices of similarity comprises only the values of the attributes associated with the labels detected on the graphic element. In other words, the ranking of the objects of the catalogue are done only on the basis of the attributes effectively selected by the administrator or by the user.

In another embodiment of the ranking method according to the invention, this set further comprises additional attribute values obtained on the basis of the values of the attributes associated with the labels detected on the graphic element.

Similarly, in an embodiment, the defining method according to the invention includes:

a step of defining the value of at least one additional attribute obtained on the basis of at least one said value of an attribute associated with a label detected on the graphic element.

This embodiment makes it possible to further speed up the defining of the attributes by the administrator or by the user since values are automatically computed for attributes not explicitly selected.

In an embodiment of the recording method or the ranking method according to the invention, the index of similarity is a distance.

In an embodiment of the recording method or the ranking method according to the invention, the index of similarity is a coefficient of correlation.

In an embodiment of the invention, the graphic element is of longitudinal shape, a longitudinal axis of this element defining a normalized frame of reference, and the relative position of the label with respect to the graphic element corresponding to the coordinate of a barycenter of this label in this frame of reference.

In a particular embodiment of the invention, the frame of reference is normalized between a non-zero minimum bound and a maximum bound. The use of a non-zero minimum bound makes it possible to privilege the selected attributes over those which are not selected.

The different steps of the method for recording objects, of the method for ranking objects, or of the method for defining the attributes of an object according to the invention are implemented by a software package or computer program.

The invention thus relates to a software package or program, able to be executed by a computer or by a data processor, this software package/program including instructions for controlling the execution of the steps of a method for recording objects and/or a method for ranking objects and/or the steps of a method for defining attributes of an object as presented above. These instructions are intended to be stored in a memory of a computer device, loaded then executed by a processor of this computer device.

This software package/program can use any programming language, and be in the form of source code, object code, or intermediate code between source code and object code, such as in a partly compiled form, or in any other desirable form.

The computer device can be implemented by one or more physically separate machines and has the overall architecture of a computer, including components of such an architecture: data memory(ies), processor(s), communication bus, hardware interface(s) for the connection of this computer device to a network or another item of equipment, user interface(s) etc.

The invention also relates to an information medium readable by a data processor and including instructions of a program as mentioned above. The information medium can be any entity or device capable of storing the program.

BRIEF DESCRIPTION OF THE DRAWINGS

Other peculiarities and advantages of this invention will become apparent from the following description of an embodiment given by way of non-limiting example, with reference to the appended drawings, wherein:

FIGS. 1 and 3B respectively represent a table and a row of a table of attributes of objects that can be used in a first particular embodiment of the invention;

FIGS. 2A to 2D represent computer screens during an exemplary implementation of a method for ranking objects in accordance with a particular embodiment of the invention;

FIG. 3A represents a computer screen during an example of implementation of a method for defining the attributes of an object in accordance with a particular embodiment of the invention;

FIG. 4 represents, in the form of a block diagram, the main steps of a method for ranking objects in accordance with the first particular embodiment of the invention; and FIG. 5 represents, in the form of a block diagram, the main steps of a method for defining the attributes of an object in accordance with a particular embodiment of the invention;

FIG. 6 represents a scattering matrix that can be used in a second embodiment of the invention;

EMBODIMENTS

FIG. 1 represents a table TATT of attributes of objects that can be used in a first embodiment of the invention.

In this example the table TATT includes the 7 objects of a catalogue CTG of objects, identified DOC1 to DOC7, each including 10 attributes AT1 to AT10.

In the remainder of the text, the attribute ATp of the object DOCk will be denoted $ATp,k$.

In this example, all the attributes of all the objects have been entered but the invention does not require it.

In this example, the attributes all have values between 0 and 100. Other limit values can be used.

It is supposed that a user wishes to search for an object in the catalogue CTG by specifying one or more of the attributes $ATp^*$ of this object.

The invention proposes to rank the objects of the catalogue CTG of objects according to an index of similarity with the searched-for object.

FIG. 2A represents a computer screen SCR for implementing a particular embodiment of the invention.

On this screen SCR are displayed 10 labels ET, bearing name-labels ET1 to ET10 and a graphic element OG of rectangular shape.

Each of these labels makes it possible to select a value of an attribute $AT1^*$ to $AT10^*$ when it is positioned on the graphic element OG. In this example, the label with name-label ETk is used to set the value of the attribute $ATk^*$.

In this exemplary embodiment of the invention, only the largest dimension of the graphic element OG, namely the longitudinal dimension, is significant. It will be supposed that it constitutes a normalized frame of reference regularly graduated from 5 to 100. In this example the scale 5 to 100 is displayed on the screen SCR but this is optional.

Figure 2B:
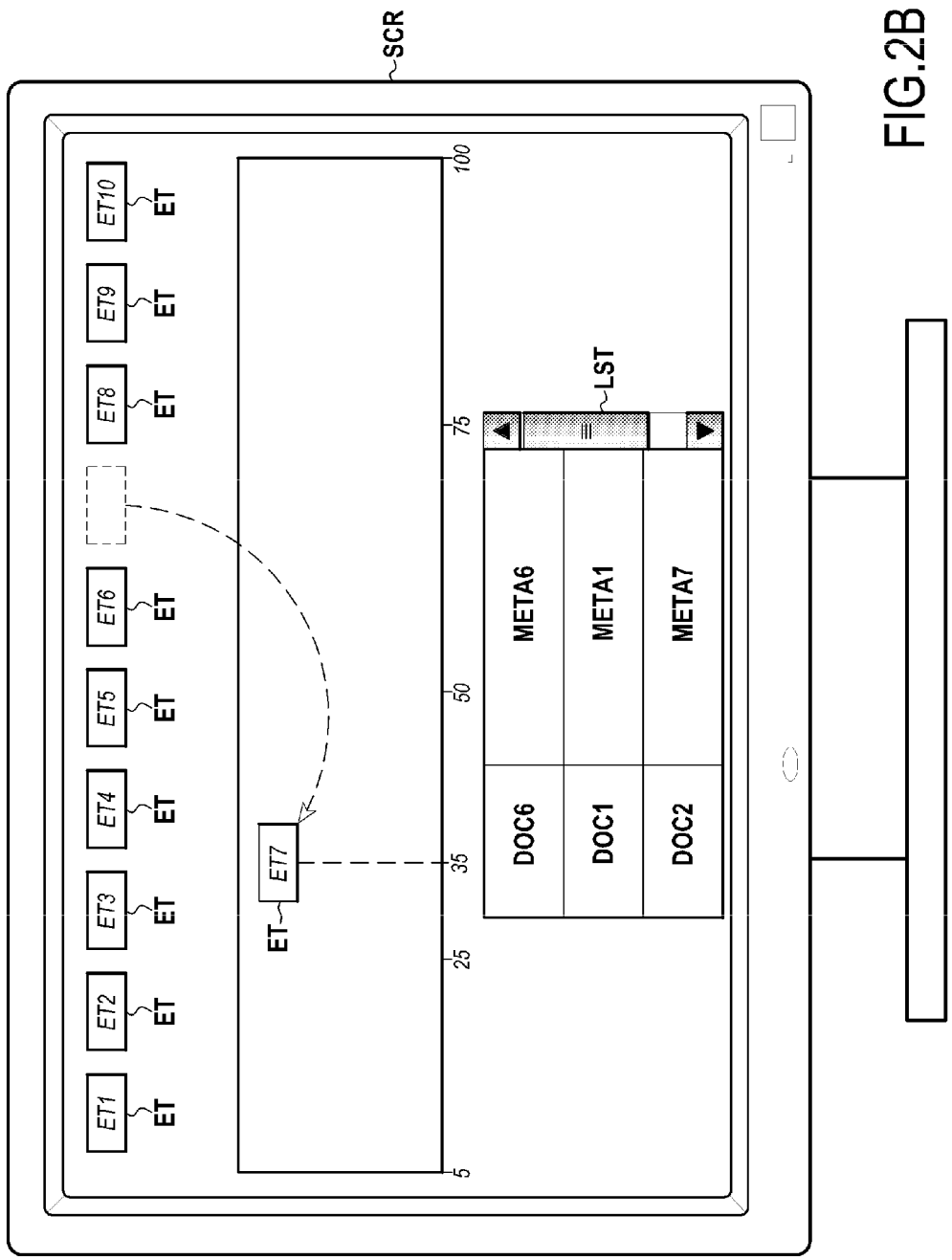

It will be considered that the user has slid the label of name-label ET7 to position it on the graphic element OG, approximately at ⅓, of this object as shown in FIG. 2B, to signify that he desires the attribute $AT7^*$ of the searched-for object to have a value in the order of 33. Specifically, in this example the position of the label (for example in the center of the label if it is rectangular) occupies the position 35.

In this first embodiment, for each of the objects DOCk of the catalogue CTG of objects, using the table TATT of FIG. 1, an index of similarity CSk between this object and the searched-for object is computed, taking into account only the attribute AT7 associated with the single label ET7 positioned by the user on the graphic element OG.

In the embodiment described here, this index of similarity CSk is a distance. This distance $D(DOCk,\{7\})$ is expressed:

$$D(DOCk,\{7\})=(AT7,k-AT7^*)^2, \text{ or}$$

$$D(DOCk,\{7\})=(AT7,k-35)^2.$$

Taking again the values of the table of FIG. 1 gives:

$$D(DOC1,\{7\})=25$$

$$D(DOC2,\{7\})=256$$

$$D(DOC3,\{7\})=1089$$

$$D(DOC4,\{7\})=400$$

$$D(DOC5,\{7\})=2025$$

$$D(DOC6,\{7\})=0$$

$$D(DOC7,\{7\})=529$$

Such that the objects ranked according to this distance measurement, from the nearest to the furthest from the target object are the objects DOC6, DOC1, DOC2, DOC4, DOC7, DOC3 and DOC5.

These objects are shown on the screen SCR in this order in an ordered list LST of which only the first three elements are apparent in the example of FIG. 2B. Metadata METAk of these objects can be presented in the list.

Figure 2C:
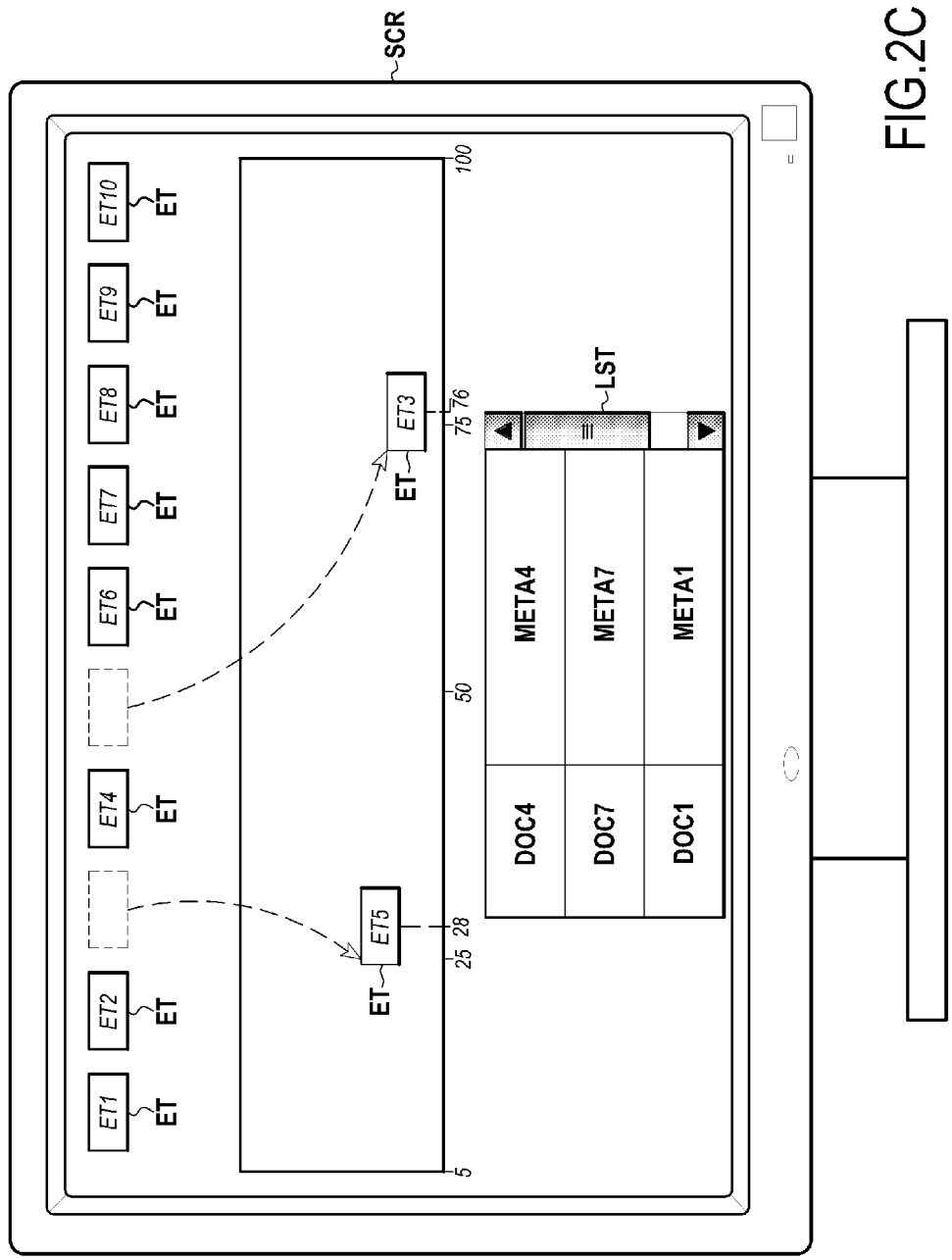

With reference to FIG. 2C, it will be supposed that the user moves the label ET7 during the graphic element OG to signify that the attribute AT7 is no longer a selection criterion of the searched-for object and that he is positioning two labels ET3 and ET5 on the graphic element OG, at positions 76 and 28 respectively.

In accordance with this embodiment of the invention, for each of the objects DOCk of the catalogue of objects, one computes the distance $D(DOCk,\{3, 5\})$ of this object with the searched-for object, taking into account only the attributes AT3 and AT5 associated with the labels ET3 and ET5 placed by the user on the graphic element OG.

In the embodiment described here, the distance $D(DOCk, \{3, 5\})$ is expressed:

$$D(DOCk,\{3,5\})=(AT3,k-AT3^*)^2+(AT5,k-AT5^*); \text{ or}$$

$$D(DOCk,\{3,5\})=(AT3,k-76)^2+(AT5,k-28)^2.$$

Taking again the values of the table of FIG. 1 gives:

$$D(DOC1,\{3,5\})=970$$

$$D(DOC2,\{3,5\})=4058$$

$$D(DOC3,\{3,5\})=4786$$

$$D(DOC4,\{3,5\})=20$$

$$D(DOC5,\{3,5\})=4040$$

$$D(DOC6,\{3,5\})=4505$$

$$D(DOC7,\{3,5\})=520$$

Such that the objects ranked according to this distance measurement from the nearest to the furthest from the target object are the objects DOC4, DOC7, DOC1, DOC5, DOC2, DOC6 and DOC3.

These objects are shown on the screen SCR in this order in the ordered list LST of which only the first three elements are apparent in the example of FIG. 2C.

Figure 2D:
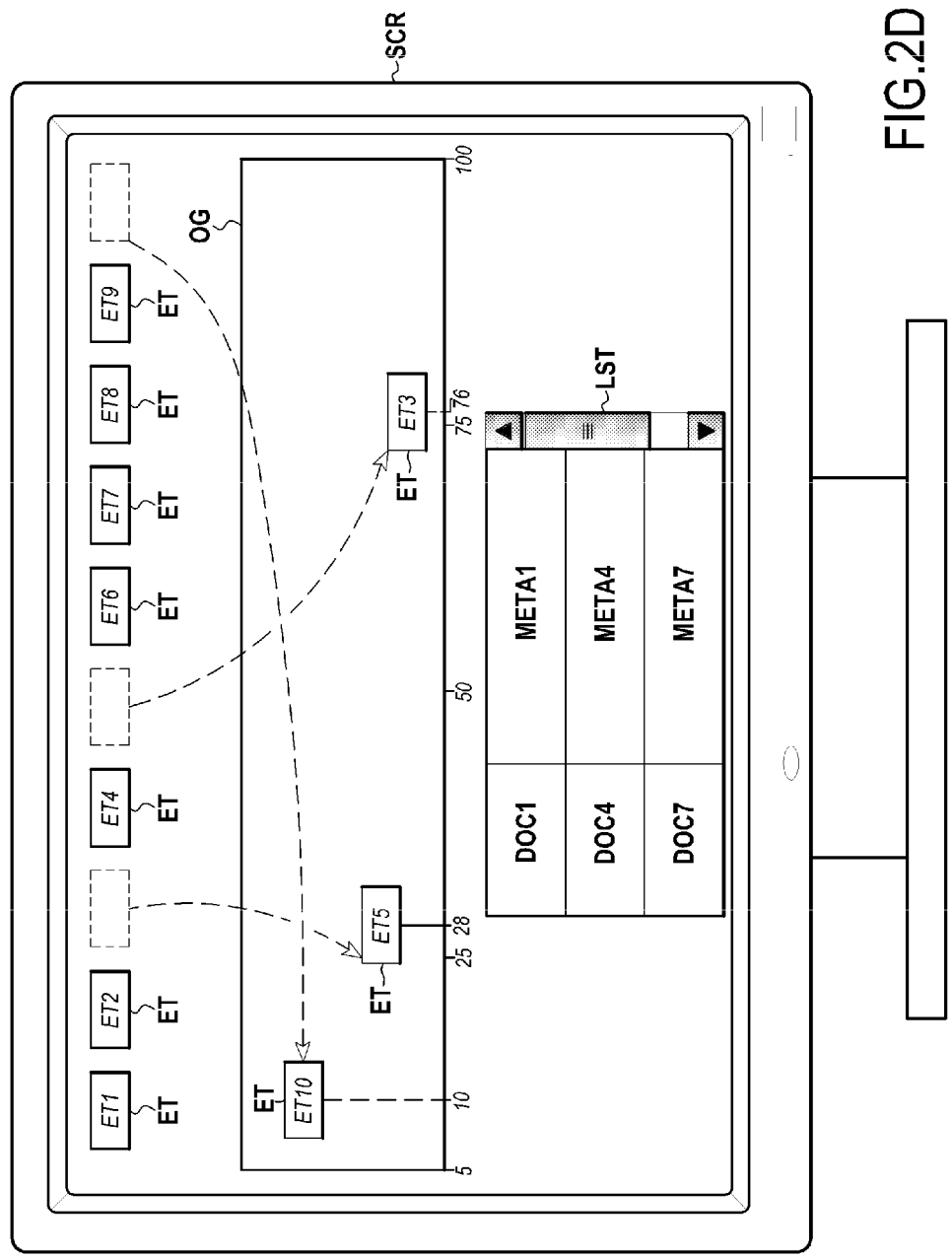

With reference to FIG. 2D, it will be supposed that the user adds the label ET10 to the graphic element OG in position 10.

In accordance with this embodiment of the invention, one computes for each of the objects DOCk of the catalogue CTG of objects the distance D(DOCk,{3, 5, 10}) of this object with the searched-for object, taking into account only the attributes AT3, AT5 and AT10 associated with the labels ET3, ET5 and ET10 positioned by the user on the graphic element OG.

In the embodiment described here, the distance D(DOCk, {3, 5, 10}) is expressed:

$$D(DOCk, \{3, 5, 10\}) = (AT3, k - AT3^*)^2 + (AT5, k - AT5^*)^2 +;$$
$$\text{or } (AT10, k - AT10^*)^2; \text{ or}$$
$$D(DOCk, \{3, 5, 10\}) = (AT3, k - 76)^2 + (AT5, k - 28)^2 + (AT10, k - 10)^2.$$

Taking again the values of the table of FIG. 1 gives:

$$D(DOC1,\{3,5,10\})=974$$

$$D(DOC2,\{3,5,10\})=4958$$

$$D(DOC3,\{3,5,10\})=5315$$

$$D(DOC4,\{3,5,10\})=1620$$

$$D(DOC5,\{3,5,10\})=9969$$

$$D(DOC6,\{3,5,10\})=4674$$

$$D(DOC7,\{3,5,10\})=1676$$

Such that the objects ranked according to this distance measurement, from the nearest to the furthest from the target object are the objects DOC1, DOC4, DOC7, DOC6, DOC2, DOC3 and DOC5.

These objects are shown on the screen SCR in this order in the ordered list LST of which only the first three elements are apparent in the example of FIG. 2D.

Very advantageously, and as shown in FIG. 3A, the same mechanism can be used to define and record, in the table TATT, the attributes of a new object DOC8 of the catalogue of objects.

As represented in this figure, to define the attributes AT1 to AT10 of this object, the user selects an identifier DOC8 of this object from a list LD and positions at least one label ET1 to ET10 on the graphic element OG.

The value of the attribute ATk,8 is obtained from the relative position of the label ETk on the graphic element OG.

In this example, the labels ET1 to ET10 are all positioned on the graphic element OG, in positions 13, 60, 80, 95, 69, 95, 50, 13, 72 and 29 respectively.

Figures 3B, 4, 5:
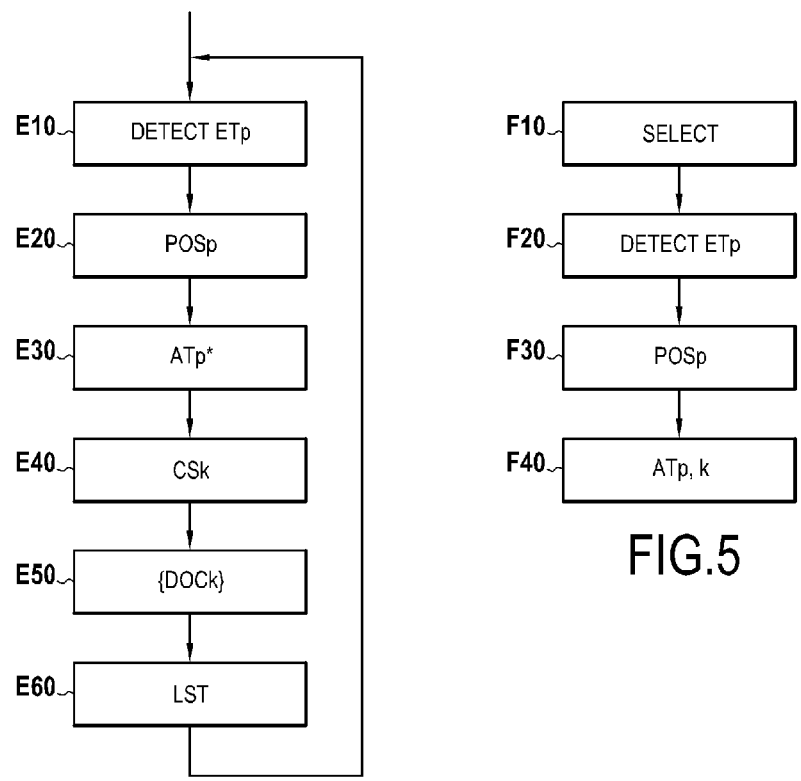

Following these operations, the table TATT of FIG. 1 is completed by the row represented in FIG. 3B.

FIG. 4 represents, in the form of a block diagram, the main steps of a method in accordance with the first embodiment of the invention, for ranking all the objects DOCk of the catalogue CTG of objects.

In accordance with the invention, each object DOCk is associated with at least one attribute ATj represented graphically, on the screen SCR of a computer, by a label ETj. A graphic element OG is also represented on the screen.

In the embodiment described here, this method is executed in a loop consisting of the steps E10 to E60 below.

The step E10 is a step of detecting the presence of at least one label ETp on the graphic element OG. This detection is effected as soon as the barycenter of the label ETp is found within the limits of the graphic element OG.

The step E10 is followed by a step E20 of determining the relative position POSp of each of these labels ETp with respect to the graphic element OG. In the embodiment described here, the graphic element OG is of longitudinal shape and a longitudinal axis of this object defines a normalized frame of reference; the position POSp of a label ETp corresponds to the coordinate of the barycenter of this label in this frame of reference.

The step E20 is followed by a step E30 of computing the value of the attributes ATp,* associated with the labels ETp positioned on the graphic element OG as a function of the positions POSp of these labels.

In the embodiment described here, the value of an attribute ATp,* corresponds to the coordinate of the barycenter of the label ETp in the aforementioned frame of reference.

The step E30 is followed by a step E40 of determining, for each of the objects DOCk of the catalogue CTG of objects an index of similarity CSk between this object DOCk and an object defined by the values of the attributes ATpi* represented by the labels ETpi positioned on the graphic element OG. In this embodiment of the invention, this criterion of similarity CSk is a distance defined by:

$$D(DOCk,\{pi\})=\Sigma_{pi}(ATpi,k-Atpi^*)^2$$

The step E40 is followed by a step E50 of ranking the objects DOCk as a function of the indices of similarity CSk and by a step E60 of displaying or updating an ordered list LST of the objects of the catalogue of objects as a function of these distances.

FIG. 5 represents, in the form of a block diagram, the main steps of a method in accordance with the invention, for defining and recording the value of at least one attribute ATp,k of an object DOCk of the catalogue CTG of objects.

This method includes a step F10 of selecting an identifier DOCk of this object, for example from a list LD.

The step F10 is followed by a step F20 of detecting, on a graphic element OG, the presence of at least one label ETp representing this attribute ATp. This detection is effected as soon as the barycenter of the label ETp is found within the limits of the graphic element OG.

The step F20 is followed by a step F30 of determining the relative position POSp of each of these labels ETp with respect to the graphic element OG. In the embodiment described here, the graphic element OG is of longitudinal shape and a longitudinal axis of this object defines a normalized frame of reference; the position POSp of a label ETp corresponds to the coordinate of the barycenter of this label in this frame of reference. The value of the attribute ATp,k is computed on the basis of this position POSp.

In the embodiment described here, the value of the attribute ATp,k is determined (step F40) as being equal to the coordinate of the barycenter of the label ETp in the aforementioned frame of reference.

In the first embodiment previously described, only the attributes associated with the labels positioned on the graphic element are taken into account for ranking the objects of the catalogue of objects.

In this second embodiment, the ranking is done taking into account a super-set of these attributes.

For this purpose, in this second embodiment of the invention, a scattering matrix is used to attribute, on the basis of the values of one or more attributes associated with the labels placed on the graphic element, values to one or more additional attributes.

FIG. 6 represents an example of such a matrix MAT. The cell at the intersection of row i and column j includes a value MAT(i, j) making it possible to define how the value of the attribute of a label ETi positioned on the graphic element OG scatters, or in other words affects the value of the attribute ATj.

In the embodiment described here:

$$AT_j = \text{Max}\{AT_i * MAT(i,j)\} \text{ with for all } i, MAT(i,i)=1.$$

In other words, in this embodiment, with an attribute ATj, during a scattering step, is associated the greatest value out of:
- the possible values obtained, where applicable, by scattering of the values associated with the other attributes ATi by positioning of the labels ETi on the graphic element OG, if MAT(i,j) is non-zero; and
- where applicable the value obtained directly by the positioning of the label ETj on the graphic element OG, if such is the case, the value MAT(j, j) being equal to 1.

In the second embodiment of the invention, this scattering step replaces the steps E30 and F40 of the ranking and defining steps of the first embodiment of the invention previously described.

For example in the case of FIG. 6, wherein MAT(2, 2)=1, MAT(7, 2)=0,8 and MAT(10, 2)=1,3, if one detects (step E10 or F20) on the graphic element OG, the label ET1 in position 80, the label ET7 in position 10, and the label ET10 in position 20, then one attributes to the attribute AT2, (step E30 or F40), the maximum value of the set {0, 8, 26} i.e. the value 26 scattered by the attribute ET10.

In this second embodiment, the set of attributes taken into account in step E40 is the set of attributes {AT1, AT2, AT7 and AT10} respectively associated with the values 80, 26, 10 and 20, corresponding to the labels ET1, ET7 and ET10 placed by the user and to the label ET2, although this has not been positioned on the graphic element OG by the user, due to the scattering of the attribute AT10.

Figure 7:
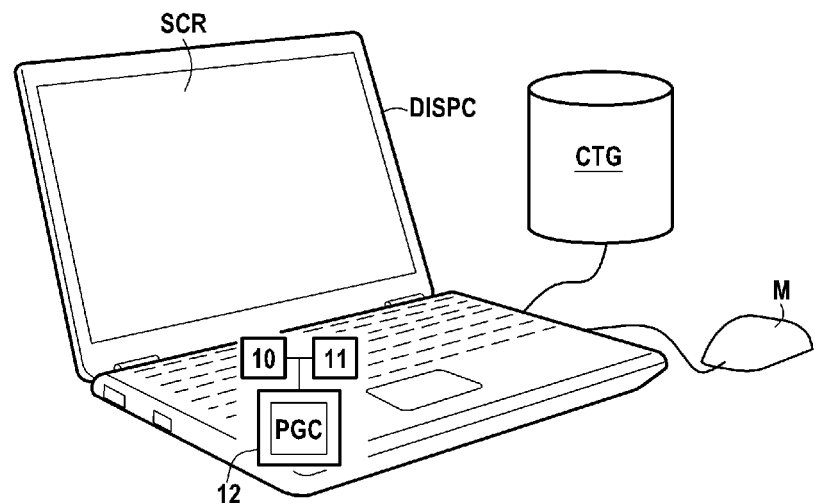
FIGS. 7 and 8 respectively represent a ranking and a defining device in accordance with particular embodiments of the invention.

FIG. 7 represents a ranking device DISPC in accordance with an embodiment of the invention. In this embodiment, this device has the architecture of a computer. It particularly includes a processor 10, a random-access memory 11, a read-only memory 12, a screen SCR and a mouse KB. The read-only memory 12 constitutes an information medium in accordance with the invention. It includes a computer program PGC allowing the implementation of a ranking method in accordance with the first or the second embodiment previously described.

This device DISPC includes means for accessing a catalogue CTG of objects, this catalogue being for example stored in a database accessible by the device DISPC via a network.

The device DISPC includes displaying means able to display on the screen SCR labels representing attributes of the objects of the catalogue CTG.

A graphic element OG, for example in the shape of a rectangle, can also be displayed on the screen SCR.

The device DISPC includes detecting means configured to detect the presence of at least one label on this graphic element OG and determining means configured to determine the relative position of the label with respect to the graphic element. In practice, each label element and/or each label can be implemented in the form of a computer object including a data structure storing the position of this object on the screen SCR. A routine implemented by the processor 10 when it executes the instructions of the program PGC corresponding to steps E10 and E20 makes it possible to check whether the barycenter of the label is found within the limits of the graphic element and where applicable determine its relative position.

The device DISPC includes computing means configured to compute values of the attributes associated with the labels detected on the graphic element as a function of the positions of these labels. These computing means can be constituted by the processor 10 when it executes the instructions of the program PGC corresponding to step E30. The processor 10 can also, in an embodiment, compute values for other attributes, on the basis of the values of the attributes associated with the labels detected on the graphic element. In practice, the value of the attributes associated with labels positioned on the graphic element can correspond to the relative position of their barycenters and the values of the attributes associated with the other labels can be obtained using a scattering matrix such as that described with reference to FIG. 6.

The device DISPC includes determining means configured to determine, for each of the objects of the catalogue CTG, an index of similarity between previously computed attribute values and the values of the corresponding attributes of this object. These determining means can be constituted by the processor 10 when it executes instructions of the program PGC corresponding to step E40 to compute a distance or a coefficient of correlation between these different values.

The device DISPC includes means for ranking objects of the catalogue CTG as a function of the indices of similarity. This ranking can be carried out by the processor 10 when it executes instructions of the program PGC corresponding to step E50.

The displaying means of the device DISPC are configured to display or update a list of the objects of the catalogue CTG ordered as a function of said indices of similarity.

Figure 8:
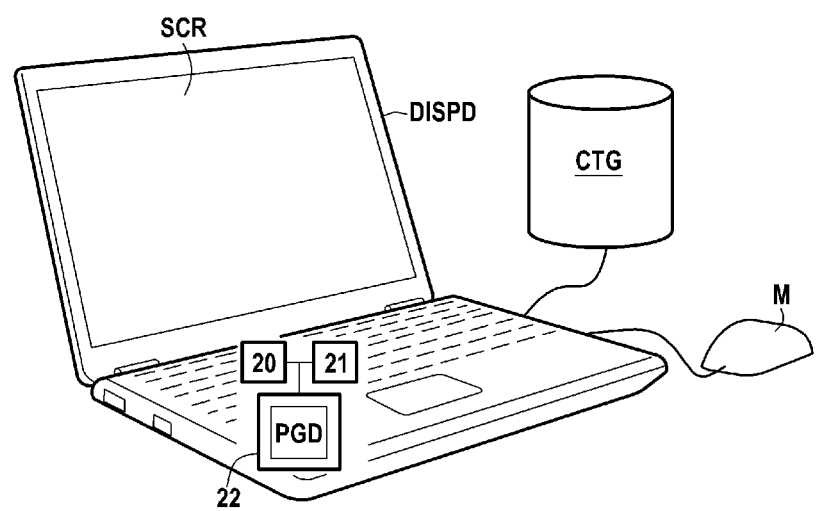

FIG. 8 represents a defining device DISPD in accordance with an embodiment of the invention. In this embodiment, this device has the architecture of a computer. It particularly includes a processor 20, a random-access memory 21, a read-only memory 22, a screen SCR and a mouse KB. The read-only memory 22 constitutes an information medium in accordance with the invention. It includes a computer program PGD allowing the implementation of a definition method in accordance with the first or the second embodiment previously described.

The device DISPD includes means for accessing the catalogue CTG of objects and for allowing the selection of an identifier of an object contained in this catalogue, for example via a drop-down menu, when the processor 21 executes instructions of the program PGD corresponding to step F10.

The device DISPD includes means identical to those of the device DISPC for:
detecting, on one and the same graphic element, the presence of a label representing an attribute (execution, by the processor 21 of the instructions of the program PGD corresponding to step F20);

determining the relative position of this label with respect to the graphic element (execution, by the processor 21, of the instructions of the program PGD corresponding to step F30);

computing the value of this attribute on the basis of this relative position of the label (execution, by the processor 21, of the instructions of the program PGD corresponding to step F40).

Figure 9:
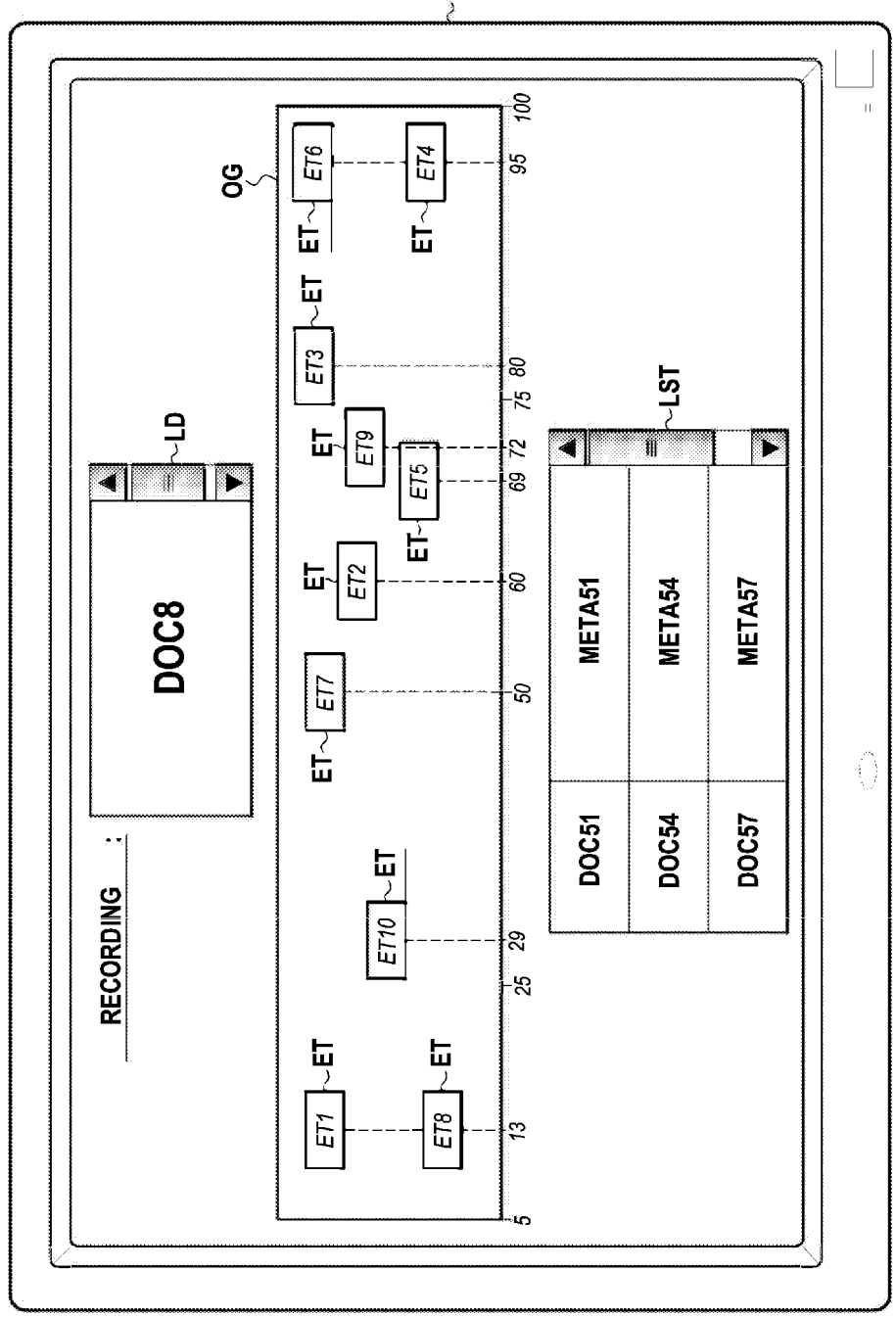
FIG. 9 represents a computer screen during an exemplary implementation of a method for recording a new object in a catalogue in accordance with a particular embodiment of the invention.

FIG. 9 represents a computer screen during an exemplary implementation of a method for recording a new object in a catalogue in accordance with a particular embodiment of the invention.

Figure 10:
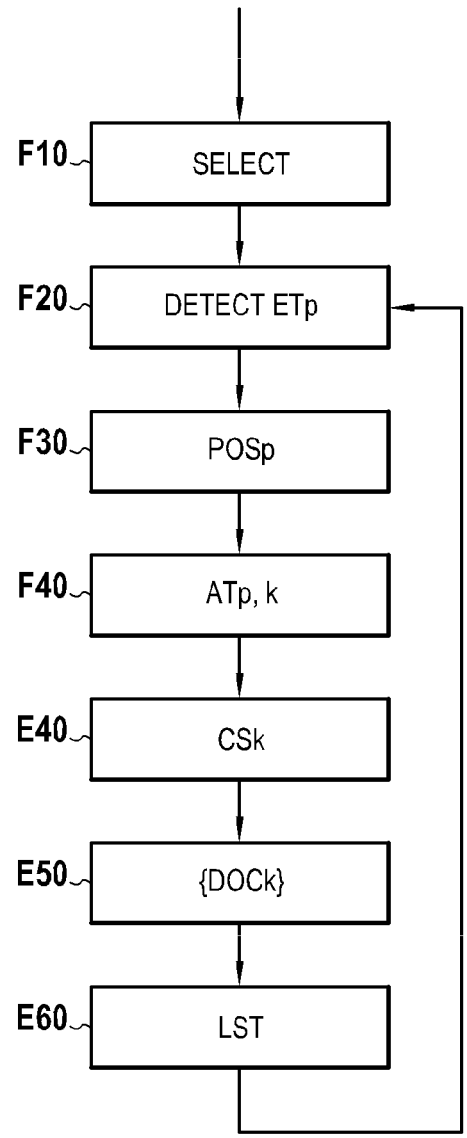
FIG. 10 represents, in the form of a block diagram, the main steps of a method for recording a new object in a catalogue in accordance with a particular embodiment of the invention.

FIG. 10 represents, in the form of a block diagram, the main steps of a method in accordance with the invention, for recording a new object DOCz in a digital catalogue of objects (CTG).

This method particularly allows the administrator of the catalogue of objects or a user to define or update the attributes of this object, by positioning labels associated with these attributes, as described with reference to FIGS. 3A, 3B and 5.

As already described, the user selects an identifier DOCz (here DOC8) of the object (step F10), for example from a list LD, then positions on the graphic element OG labels ETp representing the attributes ATp.

This method includes a step F10 of selecting an identifier DOCk of this object, for example from a list LD.

Then, in the embodiment described here, this method is executed in a loop.

Each time a label is positioned or moved on the graphic element OG, this is detected (step F20).

This detection step F20 is followed by a step F30 of determining the relative position POSp of each of these labels ETp with respect to the graphic element OG and the value of the attribute ATz,k of this new object is computed on the basis of this position POSp (step F40). During this step, it is possible to:
  either consider only the attributes associated with the labels positioned on the graphic element (as previously described with respect to the first embodiment of the invention);
  or take into account a super-set of these attributes (as previously described with respect to the second embodiment of the invention) by using a scattering matrix to attribute, on the basis of the values of one or more attributes associated with the labels placed on the graphic element, values to one or more additional attributes.

In accordance with this aspect of the invention, each time a new label on the graphic object or a movement of a label on the graphic object is detected (in accordance with test F10), a ranking is made of the objects DOCk already recorded in the catalogue as a function of their similarity with the new object and the user is shown a list LST of the objects already ranked according to their similarity. The ranking is thus updated dynamically as soon as an attribute of the new object is modified.

More precisely, and as already described with reference to FIGS. 4, 2A to 2D, this ranking includes a step E40 of determining, for each of the objects DOCk already recorded in the catalogue CTG, an index of similarity SCk between a set comprising the values of the attributes ATp,z of the new object DOCz and the set of the values of the corresponding attributes ATp,k of this object DOCk.

The objects DOCk already recorded in the catalogue are ranked (step E50) and shown (step E60) to the user in an ordered manner as a function of their index of similarity SCk.

A recording device in accordance with the invention can be obtained by combining the means of the device DISPC FIG. 7 and of the device DISPD of FIG. 8.

In particular, the recording device in accordance with the invention can have the architecture of a computer. In this embodiment, it particularly includes a processor, a random-access memory, a read-only memory, a screen and a mouse. The read-only memory 12 constitutes an information medium in accordance with the invention. It includes a computer program allowing the implementation of a recording method previously described.

This device includes means for accessing the catalogue CTG of objects and for allowing the selection of an identifier of a new object to be recorded in the catalogue, for example via a drop-down menu, when the processor executes instructions implementing step F10. This device includes means identical to those of the devices DIPSD or DISPC for:
  detecting, on one and the same graphic element, the presence of a label representing an attribute (execution, by the processor 21, of the instructions of the program PGD corresponding to step F20);
  determining the relative position of this label with respect to the graphic element (execution, by the processor 21, of the instructions of the program PGD corresponding to step F30);
  computing the value of this attribute for the new object to be recorded on the basis of this relative position of the label (execution, by the processor 21, of the instructions of the program PGD corresponding to step F40).

This device includes as the device DISPC determining means configured to determine, for each of the objects already recorded in the catalogue CTG, an index of similarity between the attribute values of the new object to be recorded represented by the labels and the values of the corresponding attributes of this object. These determining means can be constituted by the processor when it executes instructions corresponding to step E40 for computing a distance or a coefficient of correlation between these different values.

The recording device includes means for ranking the objects of the catalogue CTG as a function of the indices of similarity identical to those of the device DISPC. This ranking can be carried out by the processor when it executes instructions corresponding to step E50.

The displaying means of the recording device, like those of the device DISPC, are configured to display or update a list of the objects of the catalogue CTG ordered as a function of said indices of similarity.

In accordance with the invention, the labels positioned or moved on the graphic object are not used to give a priority to certain attributes, but to define the values at the attributes. Thus, in the example of FIG. 9, the labels ET1 to ET10 are positioned on the graphic element OG, at positions 13, 60, 80, 95, 69, 95, 50, 13, 72 and 29 respectively; so that the attributes AT8,p of the new object DOC8 take the values 13, 60, 80, 95, 69, 95, 50, 13, 72 and 29.

The documents DOC51, DOC54 and DOC57 ranked in the list LST are the documents already recorded in the catalogue the nearest to this document DOC8 in the sense of their index of similarity.

It is quite possible for a document to be ranked at the head of the list LST even if one or more of these attributes is very far away from the corresponding attribute of the new object to be recorded.

In a particular embodiment of the invention, it is furthermore possible to mark an attribute so that only the objects already recorded in the catalogue with such an attribute, preferably with a margin, are taken into account in the ranking.

The marking can for example be done with a right click of the mouse, the label associated with an element marked indispensable being green in color.

For example, if the user marks the label ET7 in green, supposing a margin of 4 units, only the objects already recorded with a value between 46 and 54 will be ranked.

In another particular embodiment of the invention, it is furthermore possible to mark an attribute so that, contrariwise, the objects already recorded in the catalogue with such an attribute are not taken into account in the ranking.

The marking can for example be done with a right click of the mouse, the label associated with an element marked prohibited being red in color.

For example, if the user marks the label ET2 in red, the objects already recorded and of which the attribute AT2 has been entered are not ranked.

The invention claimed is:

1. A computer-implemented method for recording an object in a catalogue of objects, the method comprising:
    selecting an identifier of a new object to be recorded in said catalogue;
    detecting, on a graphic element, the presence of a label to be used to set a value of an attribute of said new object;
    determining a position of said label with respect to the graphic element;
    computing a value of said attribute on the basis of said position; and
    assigning said value to said new object,
    wherein the method comprises, each time a new label on the graphic object or a movement of an existing label on the graphic object is detected, a ranking of objects already recorded in said catalogue, said ranking comprising:
    determining, for each object already recorded in said catalogue, an index of similarity between a first set comprising at least said attribute value associated with the new label positioned on the graphic object or the existing label moved on the graphic object and a second set of values of corresponding attributes of said each object;
    ranking the objects already recorded in said catalogue as a function of said determined indices of similarity; and
    displaying on an interface the updated list of the objects already recorded in the catalogue, the list being ordered as a function of said indices of similarity.

2. The method of claim 1, wherein the first set comprises only attribute values associated with labels detected on the graphic element.

3. The method of claim 1, wherein the first set further comprises additional attribute values obtained on the basis of the values of the attributes associated with the labels detected on the graphic element.

4. The method of claim 1, wherein said index of similarity is a distance.

5. The method of claim 1, wherein said index of similarity is a coefficient of correlation.

6. The method of claim 1, wherein said graphic element is of a longitudinal shape, a longitudinal axis of said element defining a normalized frame of reference, the position of said label corresponding to the coordinate of a barycenter of said label in said frame of reference.

7. The method of claim 6, wherein said frame of reference is normalized between a non-zero minimum bound and a maximum bound.

8. A non-transitory computer readable medium storing instructions that, when executed by a processor, cause the processor to implement a method for recording an object in a catalogue of objects, the method comprising:
    selecting an identifier of a new object to be recorded in said catalogue;
    detecting, on a graphic element, the presence of a label to be used to set a value of an attribute of said new object;
    determining a position of said label with respect to the graphic element;
    computing a value of said attribute on the basis of said position; and
    assigning said value to said new object,
    wherein the method comprises, each time a new label on the graphic object or a movement of an existing label on the graphic object is detected, a ranking of objects already recorded in said catalogue, said ranking comprising:
    determining, for each object already recorded in said catalogue, an index of similarity between a first set comprising at least said attribute value associated with the new label positioned on the graphic object or the existing label moved on the graphic object and a second set of values of corresponding attributes of said each object;
    ranking the objects already recorded in said catalogue as a function of said determined indices of similarity; and
    displaying on an interface the updated list of the objects already recorded in the catalogue, the list being ordered as a function of said indices of similarity.

9. The non-transitory computer readable medium of claim 8, wherein the first set comprises only attribute values associated with labels detected on the graphic element.

10. The non-transitory computer readable medium of claim 8, wherein the first set further comprises additional attribute values obtained on the basis of the values of the attributes associated with the labels detected on the graphic element.

11. The non-transitory computer readable medium of claim 8, wherein said index of similarity is a distance.

12. The non-transitory computer readable medium of claim 8, wherein said index of similarity is a coefficient of correlation.

13. The non-transitory computer readable medium of claim 8, wherein said graphic element is of a longitudinal shape, a longitudinal axis of said element defining a normalized frame of reference, the position of said label corresponding to the coordinate of a barycenter of said label in said frame of reference.

14. The non-transitory computer readable medium of claim 13, wherein said frame of reference is normalized between a non-zero minimum bound and a maximum bound.

* * * * *